LIGHT COMMUNICATION ALIGNMENT SYSTEM

Filed March 19, 1963 2 Sheets-Sheet 1

INVENTOR
L. U. KIBLER
BY Kenneth W. Mateer
ATTORNEY

May 2, 1967 L. U. KIBLER 3,316,800

LIGHT COMMUNICATION ALIGNMENT SYSTEM

Filed March 19, 1963 2 Sheets-Sheet 2

United States Patent Office 3,316,800
Patented May 2, 1967

3,316,800
LIGHT COMMUNICATION ALIGNMENT SYSTEM

Lynden U. Kibler, Middletown, N.J., assignor to Bell Telephone Laboratories, Incorporated, New York, N.Y., a corporation of New York Filed Mar. 19, 1963, Ser. No. 266,440
1 Claim. (Cl. 88—14)

This invention relates to light communication systems and, more particularly, to means for automatically aligning light beam orientation apparatus in such systems.

The advent of the optical maser, or laser, with the attendant availability of substantially single frequency coherent wave energy sources in the optical frequency range has made possible communication over wideband modulated light beams.

In such communication systems, mirrors and lenses are typically used to direct, focus, and redirect the propagating light beam. In such arrangements, it is necessary that deviations of beam orientation and direction from the desired path be kept to a minimum. In this connection, the problem of precise alignment of the redirection and focusing means becomes significant.

It is therefore an object of the present invention to maintain accurate alignment of the beam orientation apparatus in optical maser communication systems.

United States Patent No. 2,982,859 issued May 2, 1961, to E. E. Steinbrecher discloses a light beam alignment scheme for a two way ship communication system in which beams of incoherent light are detected at each location by a sensing cell. Light intensity at spaced locations around the main sensing cell is monitored by sensors separate from the main cell, the differences in intensities monitored at the various locations generating error signals which are used to correct the beam orientation apparatus at the sending station. For coherent light communication systems, however, the tolerances are considerably more critical than in an incoherent light system. Thus, for example, in the prior art the effect of temperature differentials among the sensors and of slight sensor misalignments are negligible. For coherent light communication apparatus however, the generation and focusing of substantially single frequency energy and its transmission over distances, such as hundreds of miles, in which multiple refocusing and redirection is necessary, such considerations are extremely important.

It is therefore a more specific object of the present invention to align the beam orientation apparatus in a coherent light communication system by means eliminating errors due to temperature variations and misalignments among light intensity sensing elements.

One aspect of the invention is its applicability both to beam generation and to beam transmission apparatus.

In accordance with the invention, photon sensitive means are spaced apart around the desired light beam aperture on the surface of optical maser beam orientation apparatus. The photon sensitive, or light sensitive, means can comprise photoelectric or photoconductive sensors which are formed by deposition directly on the surface of the orientation apparatus. With respect to temperature variation, therefore, the sensors are integrally associated with the orientation apparatus, thereby minimizing errors due to temperature differentials among the several sensors. Furthermore, the sensors have a fixed spatial relationship with respect to the orientation apparatus and are not subject to random misalignment produced by changing physical positioning thereof.

In accordance with a first principal embodiment of the invention, a plurality of photosensitive means are formed by deposition around the beam aperture on the surface of focusing and redirecting lenses spaced apart along a light path in an optical communication system. Any deviation of the beam from the aperture causes currents to be generated in the photosensitive means, the magnitude and sense of these currents being determined by the magnitude and sense of the associated deviation. By utilizing the sensing means in pairs which form one-half of an external bridge circuit, error signals are produced which can be used to correct the misalignment at the lens causing the deviation; i.e., the lens preceding the lens at which the deviation is detected.

In accordance with a second principal embodiment of the invention, a plurality of photosensitive means are formed by deposition around the desired area of illumination on the reflecting cavity extremities associated with an optical maser. The reflectors can be position-stabilized by reorienting the mirrors in accordance with the magnitude and sense of currents generated in the sensors by deviation of the light beam from the desired orientation.

The above and other objects of the invention, together with its various features and advantages, can be more readily understood from reference to the accompanying drawing and to the detailed description thereof which follows.

Figures 1, 2, 3:
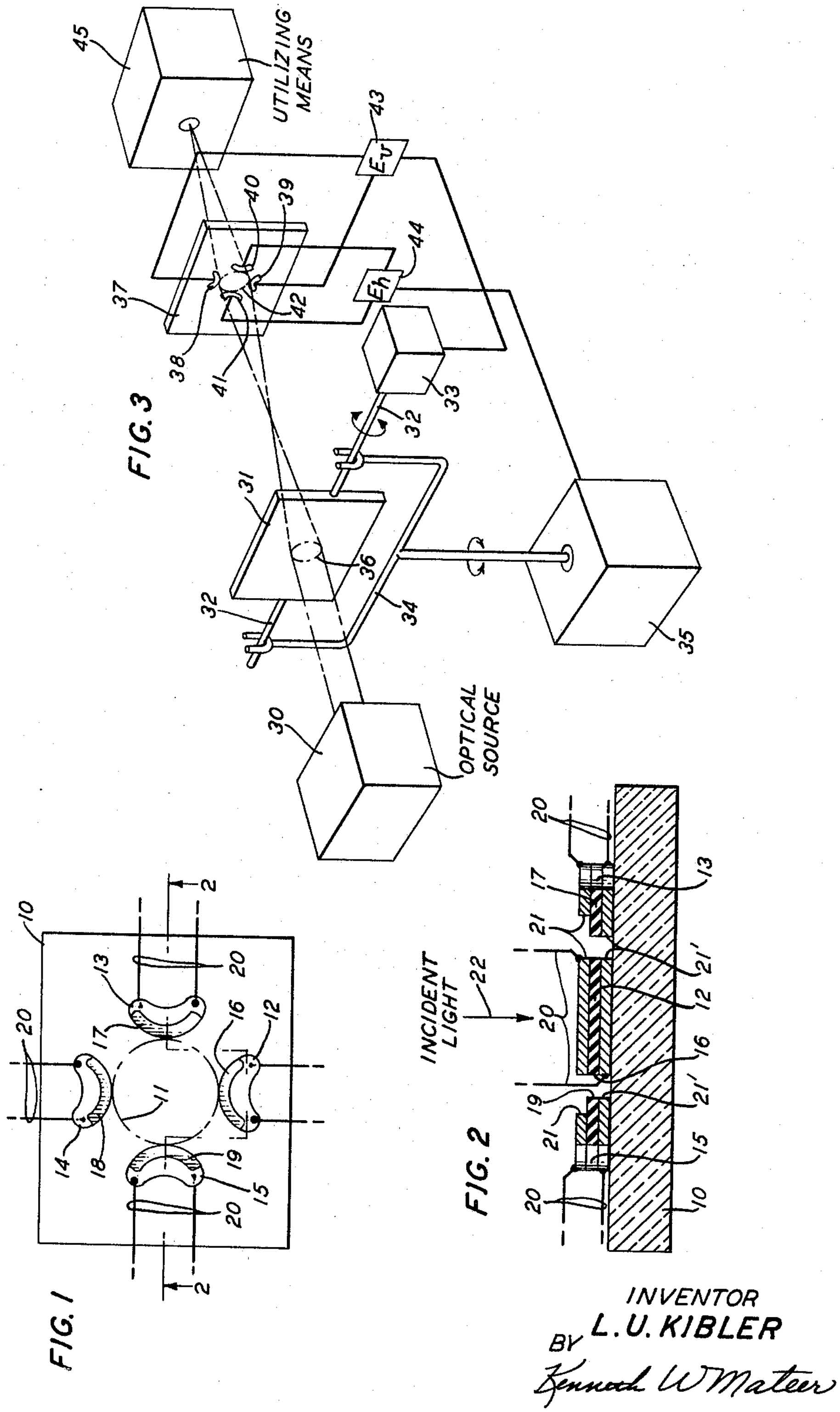
FIG. 1 is a plan view of optical apparatus embodying the invention.
FIG. 2 is a cross sectional view of the apparatus of FIG. 1 taken at line 2–2′.
FIG. 3 is a perspective view of a first optical system employing the invention.

Referring more particularly to FIG. 1, there is shown optical apparatus 10 having a preferred area of illumination indicated by circle 11. The transmittance-reflectance ratio of apparatus 10 depends upon the particular application for which the component is intended. Thus, for applications in which it is desired that the transmittance be maximized and the reflectance be minimized, apparatus 10 comprises a low loss lens. Conversely, in applications in which it is desired that the transmittance be minimized and the reflectance be maximized, apparatus 10 comprises a mirror. The present invention has equal application in either case, its usefulness being independent of the relative values of transmittance and reflectance. Disposed about the area of illumination 11 are light intensity sensing means 12, 13, 14 and 15. The area of illumination 11 is determined by the shape of the light beam, the sharpness of focus at the particular point in the optical beam system at which component 10 is interposed, and the light intensity threshold of sensing means 12 through 15.

The sensing means, which are disposed directly upon the surface of component 11 and which form an integral part thereof, can comprise any light sensitive material, and can function according to either photoelectric or photoconductive principles. One particularly advantageous sensor construction involves a sandwich arrangement in which a semiconductive material having a quantum efficiency near unity at the light frequency of interest is disposed between conductive layers. The conductive layers have a configuration whereby the semiconductive layer is partially exposed to incident light. In FIG. 1, numerals 16, 17, 18 and 19 refer to areas of exposed semiconductive material in which incident light causes a change in an electrical parameter, such as resistivity or current density, associated with the semiconductive material. A highly conductive material forms the outer surface layers of the sensor sandwich. A pair of electrical leads 20 is connected to each of sensors 12 through 15, one lead to each of the outer conductive surface layers. Thus, the semiconductive central layer between external conductive layers forms an electrical element which can be connected into an external circuit via leads 20.

The constructional relationships between the sensors and the optical beam apparatus upon which the sensors are disposed can be more readily understood from reference to FIG. 2, which is a sectional view of the component of FIG. 1, taken at line 2–2′. In FIG. 2, sensors 15, 12 and 13 are seen to be formed upon the upper surface of component 10. Each of sensors 15, 12, 13 comprises a triple layer structure consisting of conductive metallic layers 21, 21′ and semiconductive layers 19, 16 and 17, respectively. A pair of leads 20 is connected to each sensor, one lead of each pair contacting the upper conductive layer 21, the other lead of each pair contacting the lower conductive layer 21′. In operation, light is incident upon component 10 in a direction substantially parallel to arrow 22. As can be seen from the physical construction of sensors 15, 13, the incident light, when displaced from the central area of desired illumination, illuminates the semiconductive material over the area not overlaid by upper conductive layers 21. For a sensor in which the semiconductive material is photoconductive, the illumination causes the sandwich element sensor resistance, as measured at the terminals of the pair of leads 20 associated with the illuminated sensor, to change in proportion to the intensity of illumination. When the sensor is incorporated into an electrical circuit, therefore, this change in resistance caused by the displaced beam can be used to correct the orientation of the preceeding beam director to conform the incident beam to the desired area of illumination on component 10.

In fabricating optical components corresponding to that shown in FIGS. 1 and 2, the surface of the component is completely masked except for the areas to be occupied by the sensor sandwich. A thin film of conductive material such as gold for example, is evaporated on the surface. Over the gold, and with the same masking, a film of semiconductive material is deposited. Typical films comprise 10 micron layers of zinc sulphide or 0.5–1.5 micron layers of indium antimonide if the photoconductive effect is to be used, or 1 micron layer of cadmium telluride if the photoelectric effect is to be used. Advantageously, the semiconductor chosen is one which is especially sensitive to light energy of the wavelength of the optical maser beam. The masking is then increased to cover the portion of each sensor nearest the desired area of illumination, and a second film of the conductive material is deposited. Thus a conductor-semiconductor-conductor sandwich is formed, with a small region of semiconductor of the order of not more than several diffusion lengths at the edge of the illumination area that is not covered with the second conductive layer. When an incident light beam is displaced from the desired area of illumination, carriers will be generated in the illuminated region of the semiconductor. This will change a parameter associated with the entire sandwich, and can be detected via the fine contact wire leads which are bonded one to each conductive layer, as described hereinbefore.

FIG. 3 is a perspective view of an optical transmission system in which a plurality of focusing and redirecting lenses are stabilized in accordance with the invention. In FIG. 3, optical source 30 is positioned to illuminate a focusing lens 31 which is mounted in a mechanical linkage rotatable in a pair of orthogonal directions. For example, lens 31 can be mounted on transverse supporting rods 32 one of which engages vertical drive mechanism 33. Rods 32 are supported upon V-shaped frame member 34 which itself engages horizontal drive mechanism 35. Through their engagement with supporting members 32, 34, drive mechanisms 33, 35 can rotate lens 31 in two orthogonal directions, thereby controlling the direction of the light beam transmitted and focused by the lens. As illustrated in FIG. 3, the incident light beam illuminates lens 31 over a region indicated by circle 36. The beam transmitted by lens 31 is focused and directed toward a succeeding lens 37, which is spaced away from lens 31 a distance depending upon the application at hand, typically of the order of thousands of feet in a long distance optical communication system. Lens 37 focuses, and redirects if necessary, the incident light beam. In accordance with the present invention, and in order to stabilize the system of lenses, sensors 38, 39, 40 and 41 are spaced around the periphery of the desired area of illumination illustrated as circle 42. Sensors 38 through 41 are formed upon the surface of lens 37 and are constructed as described with reference to FIGS. 1 and 2. For purposes of lens stabilization, pairs of sensors are electrically associated with external circuitry. Thus sensors 38, 39 are defined as the vertical or north-south pair and sensors 40, 41 as the horizontal or east-west pair. The vertical sensor pair is electrically connected into external circuit 43 and the horizontal sensor pair is electrically connected into external circuit 44, the output of circuits 43, 44 being related ot the deviation or displacement of the beam incident on lens 37 from the desired area of illumination 42. The beam exiting lens 37 propagates to utilizing means 45 which can be a detector, an amplifier, or a succeeding focusing and redirecting means.

The outputs of circuits 43, 44 are connected respectively to drive mechanisms 33, 35. Thus, a signal from circuit 43 indicating a vertical deviation of the incident beam from the desired orientation causes vertical drive mechanism 33 to change the vertical orientation of lens 31 by an amount eliminating the deviation at lens 37. Similarly, a horizontal deviation at lens 37 causes a signal from circuit 44 to activate horizontal drive mechanism 35, thereby changing the orientation of lens 31 in a direction to reduce the horizontal deviation at lens 37 to zero.

Figure 4A:
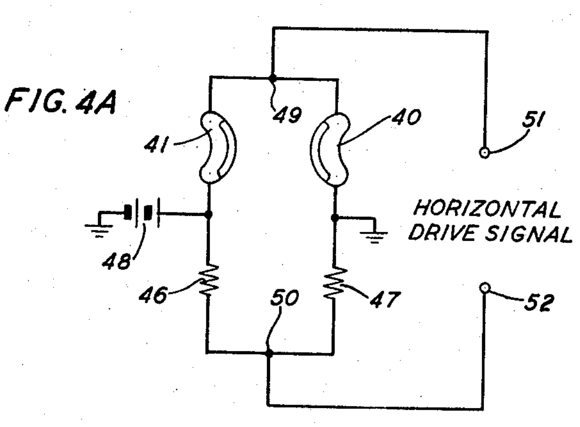
FIGS. 4A and 4B are circuit diagrams of bridge type circuits which can be employed in the arrangement of FIG. 3.
Figure 4B:
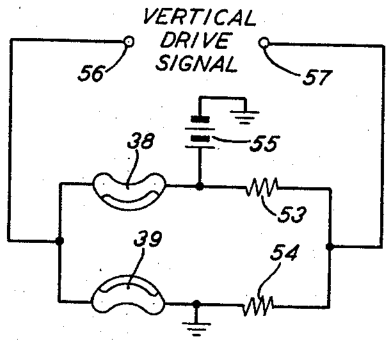

Typical circuits which can be used as circuits 43, 44 of FIG. 3 are shown in FIGS. 4A and 4B. The illustrated circuits are well-known bridge type arrangements in which the sensors form two of the four bridge arms. Thus in FIG. 4A, sensors 40, 41 are connected to form one half of a bridge circuit in which resistors 46, 47 form the remainder. Assuming that sensors 40, 41 present identical direct current resistance values, and that resistors 46, 47 are equal to each other and to the sensor resistance, a voltage 48 applied between sensor 41 and resistor 46 will produce an equal voltage drop across each of the four resistance elements, therefore producing equal voltages at points 49, 50 and a zero voltage differential between output leads 51, 52 which form the horizontal drive signal applied to horizontal drive mechanism 35 in FIG. 3. Similarly in FIG. 4B, equal resistance sensors 38, 39 are connected to form one half of a bridge circuit in which resistors 53, 54, which are equal to each other and to sensors 38, 39, form the remainder. A voltage 55 applied between sensor 38 and resistor 53 will produce equal voltages at output leads 56, 57 and therefore a zero differential vertical drive signal to be applied to vertical drive mechanism 33 of FIG. 3. However, when the light beam is displaced from its desired area of illumination, for example at lens 37 in the system of FIG. 3, the light will intercept one or more of the exposed semiconductive layers of the sensor cells on the lens surface. This light will generate carriers in the semiconductive material, thereby reducing the associated resistance and increasing the current flow in the circuits including the illuminated sensor. Thus the bridge circuit will become unbalanced, and a differential voltage proportional to the light beam displacement will appear as a drive signal to correct the displacement.

When the photocell sensors are mounted upon the lens surface, changes in their alignment with the lens aperture and with the light beam path are minimized. If the sensors were to be mounted separately, and extreme accuracy were desired, additional stabilizing systems for the sensors themselves might well be necessary. In addition, the integral lens-sensor arrangement eliminates the problem of changes in sensor resistance with temperature. The two cells which form the arms of a given bridge circuit are attached to the same surface and hence experience identical thermal conditions. Thus each cell of each pair of cells will experience identical resistance changes with temperature thus maintaining bridge balance independent of temperature.

The lens stabilization system described with specific reference to FIG. 3 involved the transmission of error signals derived at one lens to the deviation producing lens which can be spaced away a distance of the order of thousands of feet. The invention is not intended, however, to be limited to such a distant lens reorientation arrangement. Thus, for example, the error signals generated by beam deviations could be utilized to orient the local lens to eliminate cumulation of the error. That is, the local lens orientation could be adjusted to produce an exiting lens directed as if properly received at the local lens, i.e., with zero deviation. In such an arrangement, the necessity of error signal transmission to distant stations would be eliminated.

Likewise, the disclosure of the lens redirectors as single elements is not intended to be limiting. Thus, the redirectors can comprise pairs of closely spaced reflecting surfaces, as disclosed in the commonly assigned application of R. Kompfner, Ser. No. 161,566, filed Dec. 22, 1961, now United States Patent 3,224,330, issued Dec. 21, 1965, or a plurality of the warped dielectric sheets described in R. Kompfner's commonly assigned application Ser. No. 161,591, filed Dec. 22, 1961, and issued as United States Patent 3,224,331 on Dec. 21, 1965.

Figure 5:
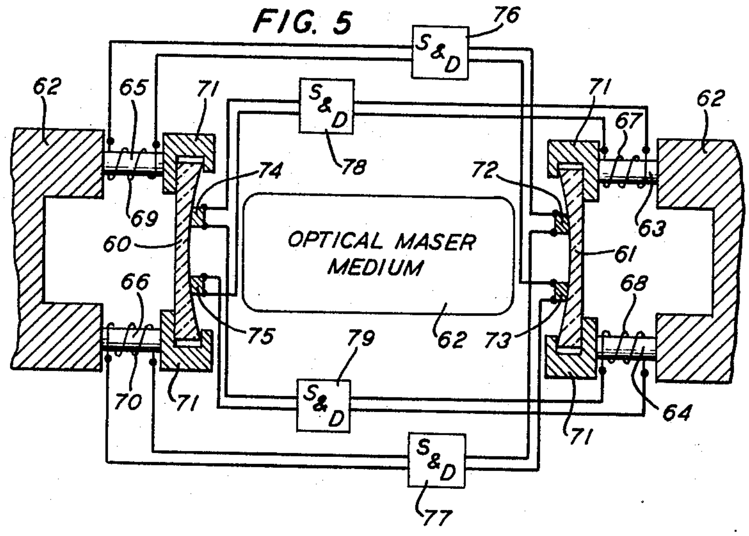
FIG. 5 is a schematic view of a second optical system employing the invention.

FIG. 5 is a sectional view of a second optical system embodying the invention. In FIG. 5 concave mirrors 60, 61 form the extremities of an interferometer cavity in which a negative temperature optical maser medium 62 is disposed. As is now known, medium 62 can comprise either a gaseous medium such as a helium-neon mixture or a solid medium such as ruby. Under proper stimulation such media can be caused to emit coherent optical energy which can be increased in amplitude by successive reflection between the cavity extremities. In the embodiment of FIG. 5, mirrors 60, 61 are supported by clamping members 71 which themselves are fastened to external frame members 62 through rods 63, 64, 65 and 65. The fastening rods comprise material exhibiting a linear dimension change in response to the application of an electrical signal. Thus for example rods 63 through 66 can comprise piezoelectric or magnetostrictive materials. In FIG. 5, the rods are illustrated as comprising magnetostrictive material and are controlled by magnetic fields produced by windings 67, 68, 69 and 70 which surround the respective rods. Disposed around the periphery of the area of desired illumination on each of mirrors 60, 61 are a plurality of light sensors 72, 73,

74 and 75 such as those described with reference to FIGS. 1 and 2. The sensors when illuminated by a displaced light beam cause an error signal to be generated in circuits 76, 77, 78 and 79 which are used to control the magnitude of the current flowing through the winding associated with the magnetostrictive rods producing the beam deviation.

In typical operation of the device of FIG. 5, a displacement of the upper portion of mirror 60 to the left causes a current to be generated in magnetostrictive rods 65, 66 by virtue of the dimension change involved. As a result of the mirror tilting, the optical maser beam is displaced from its desired position and illuminates sensor 72 on mirror 61. The difference between the amplitude of the signal generated by the illumination of sensor 72 and the amplitude of the signal monitored at sensor 73 is proportional to the displacement of the beam. This signal difference is monitored in sum and difference circuits 76, 77 and is compared with the sense of the current from rods 65, 66 respectively. Signals of appropriate sense and magnitude are then supplied to the rods by circuits 76, 77 to return the mirror 60 to a position for which sensors 72, 73 are equally illuminated. A similar process occurs in a plane at 90° to the plane of the illustrated sensors for beam displacement in that plane. It should be noted that the difference in the signals generated in the magnetostrictive rods at the displaced mirror are not used to provide an error signal, but only to determine the directional sense of the displacement. The sensor cells, being spaced away a distance typically tens of centimeters from the physical displacement of the rods are considerably more accurate to determine error signals, since the initial mirror displacement is magnified into a linear beam displacement at the opposite mirror.

In the optical system embodiments described above, the restriction of the number of sensors to four is not intended to be limiting. Thus a greater number can be used if the beam alignment tolerances are more critical, and only two could be used if correction of beam deviations in one plane only is sufficient. Also the mechanical drive mechanism of the system of FIG. 3 can be replaced by the magnetostrictive or piezoelectric rod system of FIG. 5.

In all cases, it is to be understood that the above-described arrangements are merely illustrative of the many specific embodiments which can represent an application of the principles of the present invention. Numerous and varied other arrangements can readily be devised in accordance with these principles by those skilled in the art without departing from the spirit and scope of the invention.

What is claimed is:

A beam direction stabilized coherent optical transmission system comprising a source of coherent substantially single frequency electromagnetic wave energy, first means for focusing and directing said wave energy, second means for focusing and directing wave energy focused and directed by said first means and incident upon said second means, said second means having first, second, third and fourth photon responsive elements disposed thereon in spaced relationship around a preferred area of illumination, said elements being disposed on the surface of said second means upon which said energy from said first means is incident, whereby errors due to temperature differentials and misalignments among said elements are reduced, means associated with said photon responsive elements for producing external electrical signals in response to illumination of said elements, and means responsive to said external electrical signals for changing the orientation of said first focusing and directing means, said change in orientation of said first focusing and directing means reducing said external electrical signals substantially to zero.

References Cited by the Examiner

UNITED STATES PATENTS

| | | | |
|---|---|---|---|
| 2,703,505 | 3/1955 | Senn | 88—14 |
| 2,837,959 | 6/1958 | Saunderson et al. | 88—14 |
| 2,952,779 | 9/1960 | Talley | 88—14 |
| 2,982,859 | 5/1961 | Steinbrecher | 250—203 |
| 3,170,122 | 2/1965 | Bennett | 331—94.5 |

OTHER REFERENCES

Cook et al.: "An Automatic Fringe Counting Interferometer for Use in the Calibration of Line Scales," Journal of Research of the NBS, vol. 65c, No. 2, April-June, 1961, pp. 129–140.

DAVID H. RUBIN, *Primary Examiner.*

RONALD L. WIBERT, JEWELL H. PEDERSEN, *Examiners.*